3,321,518
N-SUBSTITUTED POLY(THIOCARBAMYL) PHENOLS
Richard C. Mansfield, Haddonfield, N.J., assignor to Rohm & Haas Company, Philadelphia, Pa., a corporation of Delaware
No Drawing. Filed July 9, 1964, Ser. No. 381,533
7 Claims. (Cl. 260—551)

This application is a continuation-in-part of Ser. No. 119,801 which I filed on June 27, 1961, now abandoned.

This invention relates the production of sulfur-containing organic compounds and particularly to the products thereof.

Broadly stated, the object of this invention is to provide, as new products, N-substituted poly(N-substituted thiocarbamyl)phenols.

The novel products are prepared by the reaction of sulfur with the Mannich base derived from phenol or substituted phenols to give the corresponding thiosalicylamides or poly(N-substituted thiocarbamyl)phenols. The process employed may be generally illustrated by the following reactions:

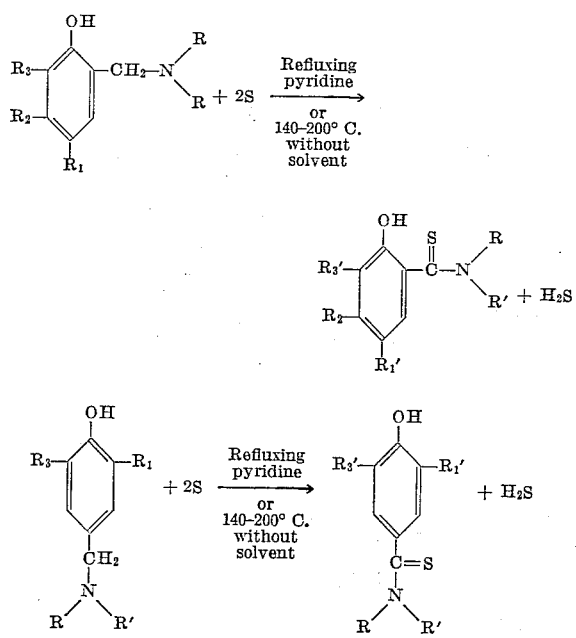

Where:

R=H or methyl
$R_1$ and $R_3$=

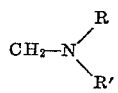

H, chloro, alkyl, or phenyl
$R_2$=H or methyl
R'=t-octyl (when R=H) or methyl (when R=methyl)

$R_1'$ is a member of the class consisting of H

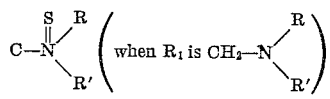

chloro, alkyl and phenyl groups; and
$R_3'$ is a member of the class consisting of H

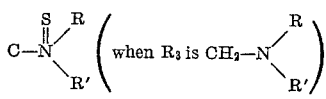

chloro, alkyl and phenyl groups.

As used in the above formulae, and throughout this application, it will be understood that the term "alkyl" has reference to straight or branched chain alkyl groups having from one to eighteen carbon atoms. One or another of the alkyl groups indicated in the formulae, etc., will be selected from this range. The term "phenyl" as used throughout the application refers to both substituted and non-substituted phenyl groups.

As indicated above, the reactions may be carried out either by refluxing a mixture of the aminomethylated phenol and sulfur in pyridine, or by heating the mixture at 140°–200° C. without a solvent. The ratio of equivalents of sulfur; amine preferably is on the order of about 2:1, although higher ratios may be used if desired. Lower ratios may be used also, although the results may not be as satisfactory. The products are isolated by distillation, crystallization and filtration, or solvent extraction depending upon the physical properties of the individual materials.

The prior art has known of the oxidation of benzylamines with sulfur. For example, Wallach, in ANN., 259, 300 (1890) reported the reaction of sulfur and benzylamine in a sealed tube to obtain thiobenzamide. Kindler, in ANN., 431, 187 (1923) reported the reaction of N,N-dimethylbenzylamine with sulfur in a sealed tube to obtain N,N-dimethylthiobenzamide. McMillan, in J. Am. Chem. Soc. 70, 868, (1948), tells of reacting sulfur and benzylamine to obtain N-benzylthiobenzamide.

However, there is no known prior disclosure of the reaction of hydroxybenzylamines (aminomethylated phenols) with sulfur to give thiosalicylamides which may be substituted in the ring with chloro, alkyl or aryl groups, although some such compounds are understood to have been made by other, non-analogous, and far more cumbersome methods. There likewise is no known prior disclosure of phenols, chlorophenols, alkylphenols, or arylphenols which are substituted by two N-dialkylthiocarbamyl groups, or for the method for their preparation; nor of N-t-alkylthiocarbamylphenols; nor of N, N, N', N', N'', N''-hexamethyl-2-hydroxy-trimesicthioamide.

The process herein described makes possible the preparation of a large variety of thiosalicylamides and novel poly(N-substituted thiocarbamyl)phenols in a far less tedious way than any of its prior art predecessors. The compounds produced in accordance with this invention, as well as complexes thereof with certain metals, have utility as fungitoxic materials. As determined by standard fungitoxicity tests, those materials perform very satisfactorily in inhibiting the germination of spores of Stem-

*phylium sarcinaeforme* (formerly known as *Macrosporium sarcinaeforme*) and of *Monolinia fructiocola* (formerly known as *Sclerotinia fructicola*).

In these tests the spores are treated on agar plates with dilutions of the compounds under test. The plates are incubated and germination or lack of germination is determined at the various dilutions. The test method, which is described in more detail in Example XX below, in essence determines if a compound has fungicidal merit to kill or inhibit growth of fungi (molds). The compound is dissolved in a solvent such as acetone and then diluted with water to give a range of concentrations. A standard number of spores are added to the solution, and droplets of this mixture are placed on slides. The droplets containing both the compound and spores are incubated for 24 hours, at which time germination counts are made.

The preferred method of making metal complexes of the compounds of this invention is described in Example XXI. The data from a number of fungitoxicity tests of my novel compound and of certain metal complexes thereof, are set forth in Table I below.

EXAMPLES III–XII

Other thiosalicylamides which were prepared using similar procedure are:

| Example | Thioamide | M.p., °C., or b. p., °C./mm. |
|---|---|---|
| III | N,N-Dimethylthiosalicylamide | 145–147/0.7. |
| IV | N,N-Dimethyl-3-methyl-5-t-octyl-thiosalicylamide. | 122.5–124. |
| V | N,N-Dimethyl-5-chlorothiosalicylamide. | 142–145. |
| VI | N,N-Dimethyl-5-chloro-3-methyl-thiosalicylamide. | 104.5–106.5. |
| VII | N,N-Dimethyl-5-chloro-4-methyl-thiosalicylamide. | 184–186, 170–5/1.0. |
| VIII | N,N-Dimethyl-3-methylthiosalicylamide. | |
| IX | N,N-Dimethyl-3-chlorothiosalicylamide. | 165–170/0.6. |
| X | N,N-Dimethyl-3-chloro-5-phenylthiosalicylamide. | |
| XI | N,N-Dimethyl-5-dodecylthiosalicylamide. | |
| XII | N,N-Dimethyl-5-octadecylthiosalicylamide. | |

TABLE I

| Compound | | Concentration, percent | Percent Inhibition of S.s. | Percent Inhibition of M.f. |
|---|---|---|---|---|
| 1(a) | Nickel complex of N,N,N',N',5-Pentamethyl-4-hydroxythioisophthalamide. | 0.1 | 100 | 100 |
| 1(b) | | 0.01 | 99 | 0 |
| 2(a) | Nickel complex of N,N,N',N',N''-Hexamethyl-2-hydroxytrimesic thioamide. | 0.1 | 100 | 100 |
| 2(b) | | 0.01 | 90 | 0 |
| 3(a) | Copper complex of N,N,N',N',5-Pentamethyl-2-hydroxythioisophthalamide. | 0.01 | 100 | 100 |
| 3(b) | | 0.005 | 100 | 78 |
| 4(a) | N,N,N',N',5-Pentamethyl-2-hydroxy-thioisophthalamide. | 0.1 | 88 | 100 |
| 4(b) | | 0.01 | 35 | 27 |
| 5(a) | N,N-Dimethyl-4-nonylthiosalicylamide | 0.1 | 100 | 100 |
| 5(b) | | 0.01 | 7 | 98 |
| 6(a) | N,N,N',N',N'',N''-Hexamethyl-2-2-hydroxy-trimesicthioamide. | 0.1 | 100 | 100 |
| 6(b) | | 0.01 | 38 | 100 |
| 7(a) | N,N-Dimethyl-2,4-dichlorothiosalicylamide | 0.1 | 100 | 100 |
| 7(b) | | 0.01 | 22 | 100 |
| 8(a) | N,N-Dimethylthiosalicylamide | 0.1 | 100 | 100 |
| 8(b) | | 0.01 | 79 | 100 |
| 9(a) | Nickel complex of N,N-Dimethyl-3,5-dichlorothiosalicylamide. | 0.1 | 100 | 100 |
| 9(b) | | 0.01 | 100 | 92 |

The invention hereinbefore described, in its various aspects, is well represented but is in no way limited by the following examples:

EXAMPLE I

*Preparation of N,N-dimethyl-5-nonylthiosalicylamide*

A mixture of 55.4 parts of 2-dimethylaminomethyl-4-nonylphenol and 13 parts of sulfur was stirred at 180°–200° C. for 3 hours while hydrogen sulfide was evolved. The mixture was cooled, diluted with heptane, filtered free of a small amount of unreacted sulfur, and distilled. The distillate was dissolved in ethyl alcohol, filtered, and redistilled to give 23 parts of N,N-dimethyl-5-nonylthiosalicylamide which came over at 185°–190° C. at 0.4 mm. and contained, by analysis, 70.30 percent of carbon, 9.34 percent of hydrogen, 4.29 percent of nitrogen and 10.38 percent of sulfur. Corresponding theoretical values are 70.31 percent, 9.51 percent, 4.56 percent, and 10.43 percent, respectively.

EXAMPLE II

*Preparation of N,N-dimethyl-5-chloro-3-phenylthiosalicylamide*

A mixture of 52.4 parts of 4-chloro-2-dimethylaminomethyl-6-phenylphenol, 13 parts of sulfur and about 100 parts of pyridine was stirred and refluxed for 8 hours, cooled, filtered free of sulfur, and stripped free of solvent. The residue consisted of 65 parts of crude product. This was recrystallized from toluene to 29 parts of N,N-dimethyl-5-chloro-3-phenylthiosalicylamide which melted at 163°–165.5° C. and contained, by analysis, 61.65 percent of carbon, 4.84 percent of hydrogen, 4.69 percent of nitrogen, 10.46 percent of sulfur, and 12.3 percent of chlorine. Corresponding theoretical values are 61.74 percent, 4.84 percent, 4.80 percent, 10.99 percent, and 12.15 percent, respectively.

EXAMPLE XIII

*Preparation of N,N,N',N'-tetramethyl-4-hydroxy-5-methylthioisophthalamide*

A mixture of 44.4 parts of 2,4-bis(dimethylaminomethyl)-6-methyl-phenol, 25.6 parts of sulfur and about 150 parts of pyridine was stirred and refluxed for 8 hours, cooled, and poured into about 1000 parts of dilute hydrochloric acid. The solid which precipitated was filtered off and recrystallized from toluene to 37 parts of N,N,N',N' - tetramethyl - 4-hydroxy-5-methylthioisophthalamide which melted at 160°–164° C. A small sample of this was again recrystallized from toluene and then melted at 165.5°–167.5° C. It contained, by analysis, 55.32 percent of carbon, 6.25 percent of hydrogen, 9.52 percent nitrogen, and 23.00 percent of sulfur. Corresponding theoretical values are 55.29 percent, 6.42 percent, 9.92 percent, and 22.70 percent, respectively.

EXAMPLE XIV

*Preparation of N,N,N',N'-tetramethyl-2-hydroxy-5-methylthioisophthalamide*

A mixture of 44.4 parts of 2,6-bis-(dimethylaminomethyl)-4-methyl-phenol and 25.6 parts of sulfur was heated at 140° C. with stirring for ½ hour, cooled to 100° C., and poured into about 200 parts of toluene. The solution was chilled and the precipitate filtered off, recrystallized from a toluene-heptane mixture, and dried in vacuo on a steam bath. There was obtained 15 parts of N,N,N',N' - tetramethyl - 2-hydroxy-5-methylthioisophthalamide which melted at 146°–147.5° C. and contained, by analysis, 55.11 percent of carbon, 6.46 percent of hydrogen, 9.58 percent of nitrogen, and 22.47 percent of sulfur. Corresponding theoretical values are 55.29 percent, 6.42 percent, 9.92 percent and 22.70 percent, respectively.

EXAMPLES XV-XVII

Other 2- and 4-hydroxythioisophthalamides prepared using similar procedures are:

| Examples | Thioisophthalamides | M.P., °C. |
|---|---|---|
| XV | N,N,N',N'-Tetramethyl-5-chloro-4-hydroxy-thioisophthalamide. | 105-107 |
| XVI | N,N,N',N'-Tetramethyl-2-hydroxy-5-t-octyl-thioisophthalamide. | |
| XVII | N,N,N',N'-Tetramethyl-2-hydroxy-5-nonyl-thioisophthalamide. | 115-117 |

EXAMPLE XVIII

*Preparation N,N,N',N',N'',N'' hexamethyl-2-hydroxytrimesicthioamide*

A mixture of 53 parts of 2,4,6-tris-(dimethylaminomethyl)phenol, 38.4 parts of sulfur and about 200 parts of pyridine was stirred and refluxed for 8 hours while hydrogen sulfide was evolved, cooled, stripped free of about 100 parts of pyridine, and poured into about 1200 parts of dilute hydrochloric acid. The solid which separated was filtered off, washed with water and toluene and dried to 49 parts of crude N,N,N',N',N'',N'' hexamethyl-2-hydroxytrimesicthioamide which melted at 220°–240° C. A small sample was purified for analysis by dissolving in 50% alcohol, filtering off a small amount of unreacted sulfur, and distilling off the alcohol and water from the filtrate. The dried product then melted at 245°–248° C. and contained, by analysis, 49.89 percent of carbon, 5.87 percent of hydrogen, 10.88 percent of nitrogen, and 27.06 percent of sulfur. Corresponding theoretical values are 50.67 percent, 5.96 percent, 11.82 percent, and 27.05 percent, respectively.

EXAMPLE XIX

*Preparation of N-t-octyl-2,5-dichlorothiosalicylamide*

A mixture of 28 parts of 2,4-dichloro-6-t-octylaminomethylphenol and 5.9 parts of sulfur was stirred at 175°–180° C. for 4 hours while hydrogen sulfide was evolved, cooled, dissolved in a mixture of ethyl alcohol and toluene, and filtered free of precipitated sulfur. The filtrate was stripped free of solvents to a tarry residue of crude N-t-octyl-2,5-dichlorothiosalicylamide which could not be made to crystallize and had a neutral equivalent of about 1600.

EXAMPLE XX

*Standard fungicide test*

*Preliminary fungitoxicity.*—This test is the test tube spore germination test carried out at 1%, 0.1% and .01% dilutions of the fungicide. Solvent is acetone and water. Care must be exercised not to use too much acetone for 40% acetone solution inhibits spore germination. In such cases, when the test material is insoluble, a wettable powder is made immediately as a time saving factor. If fungitoxicity is apparent at the above dilutions, then tests are carried out further at higher dilutions. Four drops of the spore fungicide mixture are placed on the slide for incubation and counting in the test tube dilution tests.

*Test organisms*

(1) *Macrosporium sarcinaeforme* which contains about 5,000 spores/cc. by actual count.

(2) *Sclerotinia fructicola* which contains 10,000 spores/cc.

*Procedure*

The tests are made, after test tube dilution tests are carried out, by spraying the fungicide on glass slides (approximately 1 x 3") coated with 0.25% cellulose nitrate in butyl acetate (methyl nitrocellulose) to provide an even surface. This eliminates variations due to scratches, etc., on the slides. These slides are placed on a U bend of glass rod in the large petri dish along with a control (spores but no fungicide). The coating on the slides makes for a good contact angle of the spore droplets. Correction is made for spore germination of the control. Usually the germination is 95–100%. If it is seriously out of line, the test is repeated. Occasionally low spore germination of the control may be caused by a volatile fungicide from the other slides.

Generally, 4 drops of spore solution are placed on each slide and after 16–24 hours, 25 spores are counted at random for each drop to determine how many have not germinated. This is reported as percent inhibition. It is here that correction is made for control slide if it has not germinated 100%. Usually only 100 spores (total) have to be counted. Spore cultures 15 days old are generaly used.

The slides are covered by inverted petri dishes somewhat smaller than the container.

EXAMPLE XXI

*Preparation of thioamide metal complexes*

A solution of 0.01 mol of the metal chloride (preferably the chloride of nickel, copper, iron or cobalt) in 15 ml. of water was slowly poured with stirring into a solution of 0.02 mol of NaOH and 0.02 mol of the thioamide in 25–50 ml. of water. The metal complex of the thioamide which precipitated was filtered, washed with water, dried in vacuo, and then analyzed and evaluated for fungicidal properties by means of the test method described in Example XX.

I claim:

1. Compounds of the class consisting of a phenol, a chlorophenol, an alkylphenol in which the alkyl group is $C_1$ to $C_9$, and an phenylphenol in each of which two and only two of the hydrogen atoms on the benzene ring are respectively replaced by an N-dialkylthiocarbamyl group.

2. Compounds of the class consisting of at least one N-tetraalkylhydroxythioisophthalamide in each of which one and only one of the hydrogen atoms on the benzene ring is replaced by a member of the class consisting of chloro, $C_1$ to $C_9$ phenyl and aryl groups.

3. N,N,N',N'-tetramethyl - 4 - hydroxythioisophthlamide having the structure

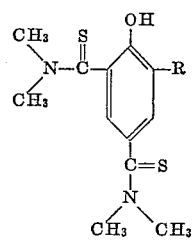

in which R is a member of the class consisting of chloro and methyl groups.

4. N,N,N',N' - tetramethyl - 2 - hydroxythioisophthalamide having the structure

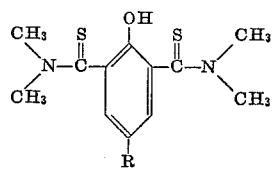

in which R is a $C_1$–$C_9$ alkyl group.

5. N,N,N',N',N'',N'' - hexamethyl - 2 - hydroxytrimesicthioamide having the structure
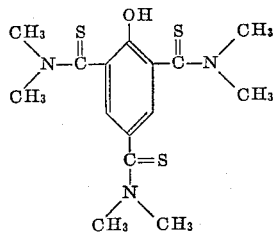
6. N,N,N',N' - tetramethyl - 4 - hydroxy - 5 - methylthioisophthalamide.
7. N,N,N',N' - tetramethyl - 2 - hydroxy - 5 - methylthioisophthalamide.
References Cited by the Examiner
UNITED STATES PATENTS
3,251,821  5/1966  Knapp _____ 260—551 X
FOREIGN PATENTS
1,031,571  6/1953  France.
1,328,010  4/1963  France.
JOHN D. RANDOLPH, *Primary Examiner.*